Patented Aug. 23, 1938

2,127,697

UNITED STATES PATENT OFFICE 2,127,697

WATER-INSOLUBLE AZO DYESTUFFS

Heinrich Morschel, Leverkusen-Wiesdorf, Eugen Rimele, Leverkusen-I. G. Werk, and Felix Gund, Cologne, Germany, assignors to General Aniline Works, Inc., New York, N. Y., a corporation of Delaware No Drawing. Application January 24, 1936, Serial No. 60,740. In Germany February 9, 1935

4 Claims. (Cl. 260—203)

The present invention relates to water-insoluble azo dyestuffs, more particularly it relates to dyestuffs which may be represented by the probable general formula:

HO—R—CONH—R'—N=N—R''

In the said formula R stands for an aromatic radical bearing the hydroxy group in ortho position to the CONH group, R' stands for a radical of the benzene series to which the azo group and CONH group are attached in para position, and R'' stands for the radical of an arylamide of a polynuclear aromatic o-hydroxycarboxylic acid, the said coupling component being coupled in ortho position to the hydroxy group.

Our new dyestuffs are obtainable by coupling either in substance or on the fiber, especially the vegetable fiber, the diazo compounds of 1,4-(mono-o-hydroxyaroyl)-diaminobenzene derivatives with arylamides of β-ketocarboxylic acids or o-hydroxycarboxylic acids which couple in ortho position to the hydroxyl group.

According to the diazotization and coupling components selected, different shades are obtained which, when prepared on the fiber, are generally distinguished by good fastness properties, as for example fastness to light, to chlorine and to boiling.

Of particular value are the combinations which are manufactured using bases of the stated type which contain as substituents in one of the two positions 2 and 5 an etherified hydroxyl group and which may contain in the other of the said positions an etherified hydroxyl group, alkyl or halogen.

The diazotization components used in the manufacture of our dyestuffs are obtainable for example either by introducing an o-hydroxyaroyl group into the amino group of a 1,4-nitroamine of the benzene series and by reducing the nitro group to the amino group, or by starting with a monoacylated 1,4-phenylene diamine, introducing the hydroxyaroyl residue into the free amino group and splitting off the acyl residue already existing in the starting material, suitable acyl residues for this purposes being, for example, the formyl, the acetyl, the arylsulfonyl and the sulfonic acid groups.

The following example illustrates the invention:

*Example.*—Cotton tissue is impregnated on the foulard with a solution manufactured in the usual manner containing per litre 15 grams of 2',3'-hydroxynaphthoyl - 1 - amino - 4 - chlorobenzene. Then the tissue is dried and, likewise on the foulard, passed through an acetic acid diazo solution prepared in the usual manner from 21.4 grams of 1(2'-hydroxy-5'-methylbenzoylamino)-4-amino-2,5-diethoxybenzene, squeezed off and at once passed through a roll vat containing water at about 80–90° C., whereby the dyestuff of the following formula:

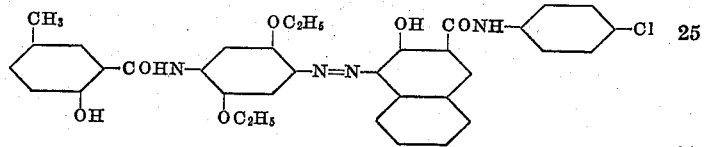

is formed. Then the tissue is soaped at the boil, rinsed and dried. In this manner a clear and greenish blue shade is obtained.

By grounding with the equivalent quantity of 2-hydroxyanthracene-3-carboxylic acid-2'-toluidide and developing in the manner described above, a deep green shade is obtained.

By using as diazotization components 1,4-(mono - o - hydroxyaroyl) - phenylene diamines which, instead of one or both ethoxy groups, contain either methoxy or other alkoxy or aryloxy groups, or also contain methyl, halogen or hydrogen in the 2,5-positions, red to blue shades are obtained.

In the following table there are given further combinations prepared analogously to paragraph 1 of this example, and the shades obtained on cotton:

general violet to blue shades of good fastness properties.

| Coupling component | Diazotization component | Shade on cotton |
|---|---|---|
| (1) 1 (2', 3'-hydroxynaphthoylamino)-2, 5-dimethoxybenzene. | 1-amino-2, 5-dimethoxy-4 (2'-hydroxybenzoyl-amino)-benzene. | Reddish blue. |
| (2) 2', 3'-hydroxynaphthoyl-4-anisidine | 1-amino-2, 5-dimethoxy-4 (2'-hydroxy-5'-methyl-benzoyl-amino)-benzene. | Do. |
| (3) 1 (2', 3'-hydroxynaphthoylamino)-3-methylbenzene | 1-amino-2, 5-diethoxy-4-(3',4'-dimethyl-6'-hydroxy-benzoyl-amino)-benzene. | Blue. |
| (4) 2', 3'-hydroxynaphthoylaminobenzene | 1-amino-2, 5-diethoxy-4-(2'-hydroxy-4'-methyl-benzoylamino)-benzene. | Reddish blue. |
| (5) 2 (2', 3'-hydroxyanthracenecarboylamino)-1-methylbenzene. | 1-amino-2, 5-diethoxy-4 (2'-hydroxy-4'-methyl-benzoylamino)-benzene. | Bluish green. |
| (6) 1 (2', 3'-hydroxynaphthoylamino)-2, 4-dimethoxy-5-chlorobenzene. | 1-amino-2, 5-diethoxy-4-(2'-hydroxy-3'-methyl-benzoylamino)-benzene. | Navy blue. |
| (7) 1 (2', 3'-hydroxynaphthoylamino)-naphthalene | 1-amino-2, 5-diethoxy-4-(5'chloro-3'-methyl-2'-hydroxybenzoylamino)-benzene. | Do. |
| (8) 2', 3'-hydroxynaphthoylaminobenzene | 1-amino-2, 5-diethoxy-4-(2'-hydroxy-5'-methyl-benzoylamino)-benzene. | Blue. |
| (9) 1 (2', 3'-hydroxynaphthoylamino)-4-chlorobenzene | 1-amino-2, 5-diethoxy-4-(2'-hydroxy-5'-methyl-benzoylamino)-benzene. | Do. |
| (10) 4 (2', 3'-hydroxynaphthoylamino)-1-methylbenzene | 1-amino-2, 5-diethoxy-4-(2'-hydroxy-5'-methyl-benzoylamino)-benzene. | Greenish blue. |
| (11) 2 (2', 3'-hydroxyanthracenecarboylamino)-1-methylbenzene. | 1-amino-2, 5-diethoxy-4-(2'-hydroxy-5'-methyl-benzoylamino)-benzene. | Green. |
| (12) 2', 3'-hydroxynaphthoylaminobenzene | 1-amino-2, 5-diethoxy-4-(2'-hydroxy-5'- chlorobenzoylamino) benzene. | Blue. |
| (13) 2', 3'-hydroxynaphthoylaminobenzene | 1-amino-2, 5-diethoxy-4-(2'-hydroxybenzoylamino)-benzene. | Do. |
| (14) 1 (2', 3'-hydroxynaphthoylamino)-2, 4-dimethoxy-5-chlorobenzene. | 1-amino-2, 5-diethoxy-4-(2'-hydroxybenzoylamino)-benzene. | Do. |
| (15) 2 (2', 3'-hydroxynaphthoylamino)-naphthalene | 1-amino-2, 5-diethoxy-4-(2'-hydroxybenzoylamino)- benzene. | Violet. |
| (16) 1 (2', 3'-hydroxynaphthoylamino)-3-nitrobenzene | 1-amino-2, 5-diethoxy-4-(2'-hydroxy-5'-methylbenzoylamino)-benzene. | Bluish violet. |
| (17) 2 (2', 3'-hydroxynaphthoylamino)-naphthalene | 1-amino-2, 5-diethoxy-4-(1', 3'-dimethyl-6'-hydroxybenzoylamino)-benzene. | Bluish black. |
| (18) 2 (2', 3'-hydroxynaphthoylamino)-1-methoxybenzene | 1-amino-2-methoxy-5-methyl-4-(2'-hydroxy-5'-methylbenzoylamino)-benzene. | Bluish violet. |
| (19) 1 (2', 3'-hydroxynaphthoylamino)-2, 4-dimethoxy-5-chlorobenzene. | 1-amino-2-methoxy-5-methyl-4-(2'-hydroxy-5'-methylbenzoylamino)-benzene. | Do. |
| (20) 2 (2', 3'-hydroxynaphthoylamino)-naphthalene | 1-amino-2-chloro-5-methoxy-4-(2'-hydroxy-5'-methylbenzoylamino)-benzene. | Bluish corinth. |
| (21) 1 (2', 3'-hydroxynaphthoylamino)-4-chlorobenzene | 1-amino-2-chloro-5-methoxy-4-(2'-hydroxy-5'-methylbenzoylamino)-benzene. | Garnet. |
| (22) 1 (2', 3'-hydroxynaphthoylamino)-4-methoxybenzene | 1-amino-2-methyl-5-methoxy-4-(2'-hydroxy-5'-methylbenzoyl-amino)-benzene. | Bluish violet. |
| (23) 4 (2', 3'-hydroxynaphthoylamino)-1-toluol | 1-amino-2-methyl-5-methoxy-4-(2'-hydroxy-5'-methylbenzoylamino)-benzene. | Do. |

We claim:
1. Water-insoluble azo dyestuffs of the general formula:

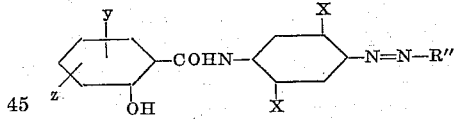

in which one X stands for an alkoxy group, the other X stands for a substituent selected from the group consisting of alkoxy, alkyl and halogen, y stands for a member selected from the group consisting of hydrogen, methyl and chlorine, z stands for a member selected from the group consisting of hydrogen and methyl, R'' stands for the radical of a 2,3-hydroxynaphthoic acid arylamide, yielding when produced on the fiber in 2. The dyestuff of the following formula:

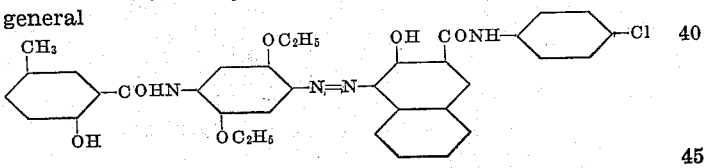

yielding when produced on the fiber clear greenish blue shades of good fastness properties.

3. Fibers dyed with a dyestuff as claimed in claim 1.

4. Fibers dyed with a dyestuff as claimed in claim 2.

HEINRICH MORSCHEL.
EUGEN RIMELE.
FELIX GUND.